United States Patent
Douglas et al.

(10) Patent No.: US 10,977,059 B1
(45) Date of Patent: Apr. 13, 2021

(54) IMPLEMENTING OBJECT VALIDATION, WEB REQUEST HANDLING, OBJECT RELATIONAL MAPPING, OR MESSAGING VIA DIRECT BYTECODE GENERATION

(71) Applicant: Red Hat, Inc., Raleigh, NC (US)

(72) Inventors: Stuart Douglas, Orange (AU); Guillaume Smet, Lyons (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/829,599

(22) Filed: Mar. 25, 2020

(51) Int. Cl.
*G06F 9/44* (2018.01)
*G06F 9/455* (2018.01)
*G06F 8/41* (2018.01)

(52) U.S. Cl.
CPC ............ *G06F 9/4552* (2013.01); *G06F 8/436* (2013.01)

(58) Field of Classification Search
None
See application file for complete search history.

(56) References Cited

U.S. PATENT DOCUMENTS

| | | | | |
|---|---|---|---|---|
| 6,918,122 B2* | 7/2005 | Matula | ............... | G06F 8/447 719/316 |
| 8,280,919 B2* | 10/2012 | Krishnaswamy | ..... | G06F 9/4488 717/104 |
| 9,613,446 B2 | 4/2017 | Fox et al. | | |
| 9,946,517 B2 | 4/2018 | Talby et al. | | |
| 2011/0197197 A1* | 8/2011 | Ni | ............... | G06F 9/547 718/104 |
| 2014/0222843 A1* | 8/2014 | Sareen | ............... | H04L 67/1097 707/755 |
| 2018/0107769 A1 | 4/2018 | Kumar et al. | | |

FOREIGN PATENT DOCUMENTS

CN 109558127 A 4/2019
WO WO2019223867 A1 11/2019

OTHER PUBLICATIONS

Micronaut; "Micronaut"; Natively Cloud Native, Version 1.2.6; Accessed on or before Nov. 29, 2019; 300 Pages.

* cited by examiner

*Primary Examiner* — Qamrun Nahar
(74) *Attorney, Agent, or Firm* — K&L Gates LLP (57) ABSTRACT

A system includes a memory and a processor in communication with the memory. The processor is configured to process at least one application file. Additionally, the processor is configured to generate at least one bytecode from the at least one application file prior to a start-up time responsive to processing the at least one application file. A first bytecode of the at least one bytecode contains a metamodel and the metamodel handles object validation. Additionally, the metamodel is directly generated as the bytecode prior to the start-up time and after a compile time. The processor is also configured to store the first bytecode.

20 Claims, 6 Drawing Sheets

IMPLEMENTING OBJECT VALIDATION, WEB REQUEST HANDLING, OBJECT RELATIONAL MAPPING, OR MESSAGING VIA DIRECT BYTECODE GENERATION

BACKGROUND

Computer systems may run applications or services that are provided via a server or cloud. The applications or services can be developed and deployed at start-up time. Application instances or services may run within containers, which may be run on physical or virtual machines. The containers may be used to separate various components of a computing system. For example, different components of a computing system may be executed at different containers and/or virtual machines executing on a computing device.

The containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times.

SUMMARY

The present disclosure provides new and innovative systems and methods for implementing object validation, web request handling, object relational mapping and/or messaging via direct bytecode generation. In an example, a system includes a memory and a processor in communication with the memory. The processor is configured to process at least one application file. Additionally, the processor is configured to generate at least one bytecode from the at least one application file prior to a start-up time responsive to processing the at least one application file. A first bytecode of the at least one bytecode contains a metamodel and the metamodel handles object validation. Additionally, the metamodel is directly generated as the bytecode prior to the start-up time and after a compile time. The processor is also configured to store the first bytecode.

In an example, a method includes processing at least one application file and responsive to processing the at least one application file, generating at least one bytecode from the at least one application file prior to a start-up time. A first bytecode of the at least one bytecode contains a metamodel and the metamodel handles object validation. Additionally, the metamodel is directly generated as the first bytecode prior to the start-up time and after a compile time. The method also includes storing the first bytecode.

In an example, a non-transitory machine-readable medium stores code, which when executed by a processor is configured to process at least one application file and responsive to processing the at least one application file, generate at least one bytecode from the at least one application file prior to a start-up time. A first bytecode of the at least one bytecode contains a metamodel and the metamodel handles object validation. Additionally, the metamodel is directly generated as the first bytecode prior to the start-up time and after a compile time. The non-transitory machine-readable medium is also configured to store the first bytecode.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Generally, object validation is implemented by building a metamodel that decides if a given object is valid. The metamodel or surrogate model provides the frames, rules, constraints, etc. for determining if the given object is valid. Specifically, an object validation process may validate an object based on or subject to certain confines. Object validation may be used to validate a request from a web service or validate an input to ensure that the input is in the proper form (e.g., integer, string, etc.) or pattern.

One approach is to generate a metamodel in memory at start-up time, which is the approach most systems use (e.g., Spring, Weld, Hibernate, Validator, Apache BVal). When the application is started, the application is scanned and a metamodel is built from annotations discovered during the scanning process. However, generating application code at start-up time is a complex process. For example, when the metamodel is built at start-up time, annotations are parsed and then processed, which may involve loading several different classes, leading to an application with a larger memory footprint than the systems and methods described herein. The disadvantages associated with the slower start-up times and additional memory usage of generating the metamodel at start-up time are augmented when implementing application instances on a cloud. For example, hundreds to thousands of application instances may be deployed and started on the cloud, and each instance may incur these additional memory costs.

Another approach is to generate a metamodel at compile time. In this approach, the metamodel may be generated as source files (e.g., Java source files), which are then compiled as part of the compilation process. The approach of generating the metamodel at compile time is used by systems such as Dagger and Micronaut™. However, generating the metamodel as part of the compilation process results in compiling additional files, which slows down the compilation process and may add to the memory footprint of the resulting application during storage prior to being started (the memory footprint is typically larger when generating the metamodel in memory at start-up time than generating the metamodel at compile time).

As noted above, both of the existing approaches have downsides. For example, generating a metamodel in memory at start-up time slows down application start-up and delays application start-up. Furthermore, generating the metamodel as Java source files that are compiled as part of the compilation process ties object validation (or similarly web request handling, object relational mapping and/or messaging) to the compilation process and results in extra source files that are then compiled. The additional source files that require compilation can significantly slow down the compilation process and result in reduced developer productivity.

The techniques disclosed herein implement object validation, web request handling, object relational mapping and/or messaging via direct bytecode generation. Rather than generating source files that need to be compiled, bytecode is directly generated that contains the metamodel. For example, the bytecode is directly generated instead of being generated as part of the start-up process by parsing and processing annotations or being generated as source files and then compiled as part of the compilation process. The generated bytecode can then either be included in the application or loaded directly into a ClassLoader in memory. Additionally, by generating the bytecode directly, the resulting production applications created from the bytecode have a smaller memory footprint than both of the existing approaches discussed above.

Since the bytecode includes the metamodel, the metamodel can be packed in the application without having to build the metamodel at start-up. This reduces start-up time and also reduces memory usage, which is especially important for high density cloud environments. Additionally, directly generating the bytecode that contains the metamodel prevents extra code from being compiled at compile time, which allows for faster turnaround time for application developers, increasing productivity. Furthermore, because the techniques disclosed herein are not tied to the compilation process, updates may be handled in a much more flexible manner as applications can be updated without being completely recompiled.

Figure 1:
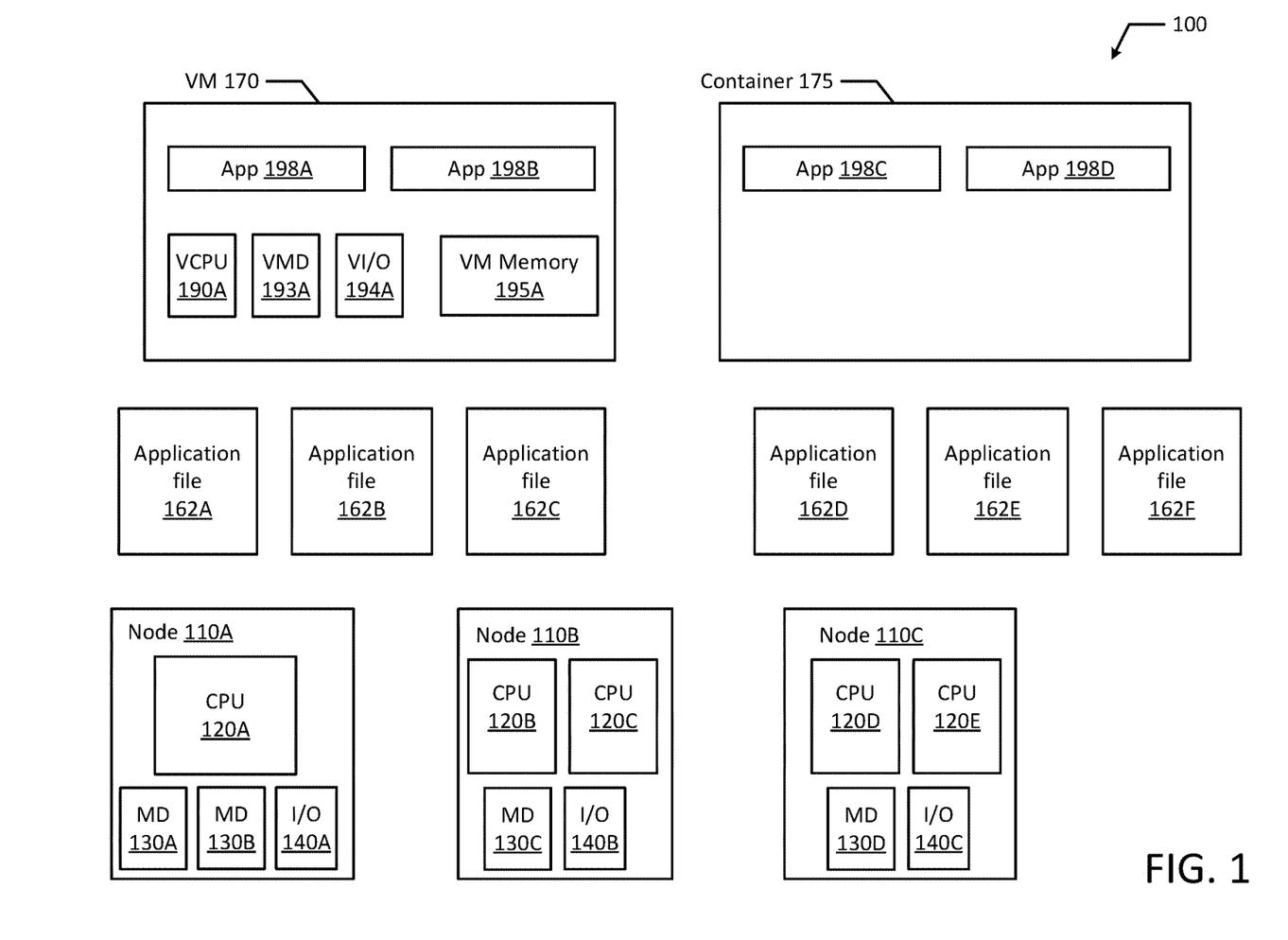
FIG. 1 illustrates a block diagram of an example computing system according to an example embodiment of the present disclosure.

FIG. 1 depicts a high-level component diagram of an example computing system 100 in accordance with one or more aspects of the present disclosure. The computing system 100 may include application files 162A-F, one or more virtual machines 170 or containers 175, and nodes (e.g., nodes 110A-C). Virtual machines 170 may be provisioned on the same host or node (e.g., node 110A) or different nodes. For example, a VM 170 and another VM (not pictured) may both be provisioned on node 110A. Alternatively, VM 170 may be provided on node 110A while another VM (not pictured) is provisioned on node 110B. Similarly, containers 175 may be provisioned on the same host or node (e.g., node 110A) or different nodes. For example, container 175 and another container (not pictured) may both be provisioned on node 110A. Alternatively, container 175 may be provisioned on node 110A while another container (not pictured) is provisioned on node 110B.

Computer systems may run applications or services that are provided via a server or cloud. The applications or services can be developed and deployed as a single unit or as multiple units. Applications 198A-D may run within virtual machines 170 or containers 175. The containers 175 may be run on or executed within physical or virtual machines 170. For example, containers 175 may encapsulate a lightweight runtime environment for an application. The virtual machines 170 or container 175 may be replicated across node clusters. The virtual machines 170 or containers 175 may each run a process, service or application (e.g., applications 198A-D). The virtual machine 170 or container 175 may be executed in any execution environment.

It should be appreciated that containers 175 may be stand-alone execution environments, similar to that of a virtual machine 170. In an example, container 175 may instead be a virtual machine 170 that execute applications or services. The applications 198A-D may run in a container 175 or a virtual machine 170.

Application files 162A-F, referred to herein generally as application files 198, may each be processed to generate bytecode for an application. For example, application files 162E-F may be processed to generate bytecode for application 198A. In another example, application files 162A-C may correspond to application 198A while application files 162D-F correspond to application 198B or 198C. Additionally, each application file (e.g., application file 162A) may correspond to a single application (e.g., application 198A). For example, an application file 162 may be a Java Archive ("JAR") file. A JAR file or JAR is a package file format typically used to aggregate many Java class files and associated metadata and resources (e.g., text, images, etc.). For example, the JAR file may correspond to a single application file (e.g., application file 162A) for distribution. JAR files may be "uber-jars", which may also be referred to as "over-jars" or "fat-jars", which are used to create single application packages.

A virtual machine 170 may include a virtual machine memory (VM Memory 195), a virtual CPU (VCPU 190), virtual memory devices (VMD 193), and virtual input/output devices (VI/O 194). In an example, a virtual machine may execute a guest operating system and run applications 198A-B which may utilize the underlying VCPU, VMD, and VI/O device. As mentioned above, one or more applications 198A-B may be running on a virtual machine under the respective guest operating system. A virtual machine may run on any type of dependent, independent, compatible, and/or incompatible applications on the underlying hardware and operating system ("OS"). Additionally, applications 198A-B run on a virtual machine may be compatible with the underlying hardware and/or OS.

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). The memory devices 130A-D may include native image cache (e.g., native image cache 132 of MD 130A). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E), generally referred to herein as processor(s) 120, may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

The processor(s) 120 may process application file(s) 162A-F. For example, the application files 162 may be unpackaged, extracted and processed. After processing the application file(s) 162A-F, the processor may generate bytecode from the application file(s) 162 prior to start-up time.

In an example, the bytecode contains a metamodel that handles object validation. For example, the metamodel may be used to decide if a given object is valid. In an example, the metamodel or surrogate model provides the frames, rules, constraints, etc. for determining if the given object is valid. Specifically, an object validation process may validate an object based on or subject to certain confines. Object validation may be used to validate a request from a web service or validate an input to ensure that the input is in the proper form (e.g., integer, string, etc.) or pattern.

In another example, the bytecode contains a metamodel for web request handling. Specifically, the metamodel may build an application or an API such as a Java API for RESTful Web Services ("JAX-RS"). JAX-RS uses annotations to simplify the development and deployment of web service clients and endpoints. For example, JAX-RS provides annotations to aid in mapping a resource class as a web resource. Some of the annotations include "@Path", "@GET", "@PUT", "@POST", "@DELETE", "@HEAD", "@Produces" and "@Consumes". "@Path" specifies the relative path for a resource class or method. "@GET", "@PUT", "@POST", "@DELETE", and "@HEAD" specify the HTTP request type of a resource. "@Produces" is used for content negotiation and specifies the response internet media type(s). "@Consumes" species an accepted request internet media type(s).

In one example, the metamodel my include the "@Path" annotation on a class which tells the system that this class handles requests for a relative path or requests sent to a specific destination (e.g., /PathExampleTest). Multiple methods may be implemented to handle specific sub paths. For example, a first method may handle requests (e.g., /PathExampleTest/Stuart) that passes a string (e.g., "Stuart") in the first method parameter because the annotation (e.g., @PathExample) matches an identifier (e.g., {id1}) in the path. A second method may match "/PathExampleTest/Stuart/Douglas with the strings "Stuart" and "Douglas" being injected as the method parameters, and so on.

Bytecode containing a metamodel(s) for web request handling may provide functionality for various different use cases. For example, the metamodel may include complex matching rules that include other information from the request (e.g. the content-type or accept headers).

In another example, the bytecode contains a metamodel for object relational mapping. Specifically, the metamodel may be used to build an application or an API such as a Java Persistence API ("JPA"). For example, the metamodel may be used (e.g., by a processor, compiler, or serialize) as an input to build and application or API. JPA is a programming interface that describes the management of relational data in applications using the Java platform. For example, JPA specifies persistence for relational database management systems and focuses on object relational mapping. A persistence entity is a lightweight Java class whose state is typically persisted to a table in a relational database. Instances of a persistence entity may correspond to individual rows in a table. Entities typically have relationships with other entities, and these relationships may be expressed through object-relational metadata, which may be specified directly in the entity class file by using annotations or may be specified in a separate XML descriptor file distributed with the application.

In an example, bytecode containing a metamodel(s) for object relational mapping may include a class or classes that maps to a database table with "id" and "name" columns and annotations may instruct the JPA implementation how to map the class to the database. In some instances, the object relational mapping may also inform a user if an input, such as an "entity name" is too long. The object relational mapping may also inform a user that an input or entry is blank.

In another example, the bytecode contains a metamodel for messaging. For example, the metamodel may use annotations to map messaging channels to fields in the Java code. The mapped messaging channels may then be used directly. In an example, the metamodel may be used for reactive messaging systems, such as a MicroProfile Reactive Messaging system. MicroProfile Reactive Messaging provides a way to connect event-driven microservices. In an example, Eclipse Microprofile Reactive Messaging demonstrates that an "@Incoming" annotation may be used to map incoming messages to a Java method. When a message is received on the specified channel, the method is invoked with the contents of the message.

A metamodel may be generated at start-up time or may be generated as source files and compiled at compile time. However, the techniques disclosed herein implement one or more of object validation, web request handling, object relational mapping and/or messaging via direct bytecode generation, for example, the processor 120 directly generates the bytecode that contains the metamodel prior to start-up time. The processor 120 may serialize application files into bytecode that contains the metamodel. Instead of generating a metamodel in memory at start-up time, which slows down application start-up and delays application start-up, the processor 120 directly generates bytecode that contains the metamodel, which can be packed in the application without having to build the metamodel at start-up, to avoid start-up delays.

In an example, the processor 120 may serialize the application files 162 into bytecode, which may also be referred to as portable code or p-code. The processor 120 may also serialize the application files into another type of intermediate representation. In an example, the processor 120 may serialize the application files 162 by passing the application files 162 to a serializer. For example, the serializer may receive the application files 162 and may output a serialization of the application files 162, and the resulting output may be bytecode that includes a metamodel for controlling object validation (or similarly web request handling, object relational mapping and/or messaging). Then, the bytecode may be executed to start an application instance. Processors 120 or VCPU 190A may each have their own serializer that runs on the processor.

Additionally, generating the metamodel as Java source files that are compiled as part of the compilation process ties object validation (or similarly web request handling, object relational mapping and/or messaging) to the compilation process and results in extra source files that are then compiled, which can significantly slow down the compilation process and result in reduced developer productivity. Rather than generating source files that need to be compiled, the processor 120 directly generates bytecode, which can then either be included in the application or loaded directly into a ClassLoader in memory.

Furthermore, because the techniques disclosed herein are not tied to the compilation process, updates may be handled in a much more flexible manner as applications can be updated without being completely recompiled. The reduced start-up times, smaller memory footprints, and flexible application updates are especially important for high density cloud environments. For example, the techniques disclosed herein allow developers to perform "fast hot reloads", which advantageously provide fast development cycles and improved workflow while still keeping memory usage low. When performing a "fast hot reload" an application file, such as a Java file, may be modified, a browser may be refreshed, the application or service may be compiled, bytecode analysis may be re-run, and an updated page may be served. The same small memory footprint bytecode used to launch an application instance may be used during a development cycle, which allows for more efficient and flexible application updates to reduce test system latency while keeping memory usage low. The memory savings also reduces the amount of necessary hardware (e.g., RAM) for the system, and on larger scales, the reduction in necessary hardware may be quite significant.

Figure 2:
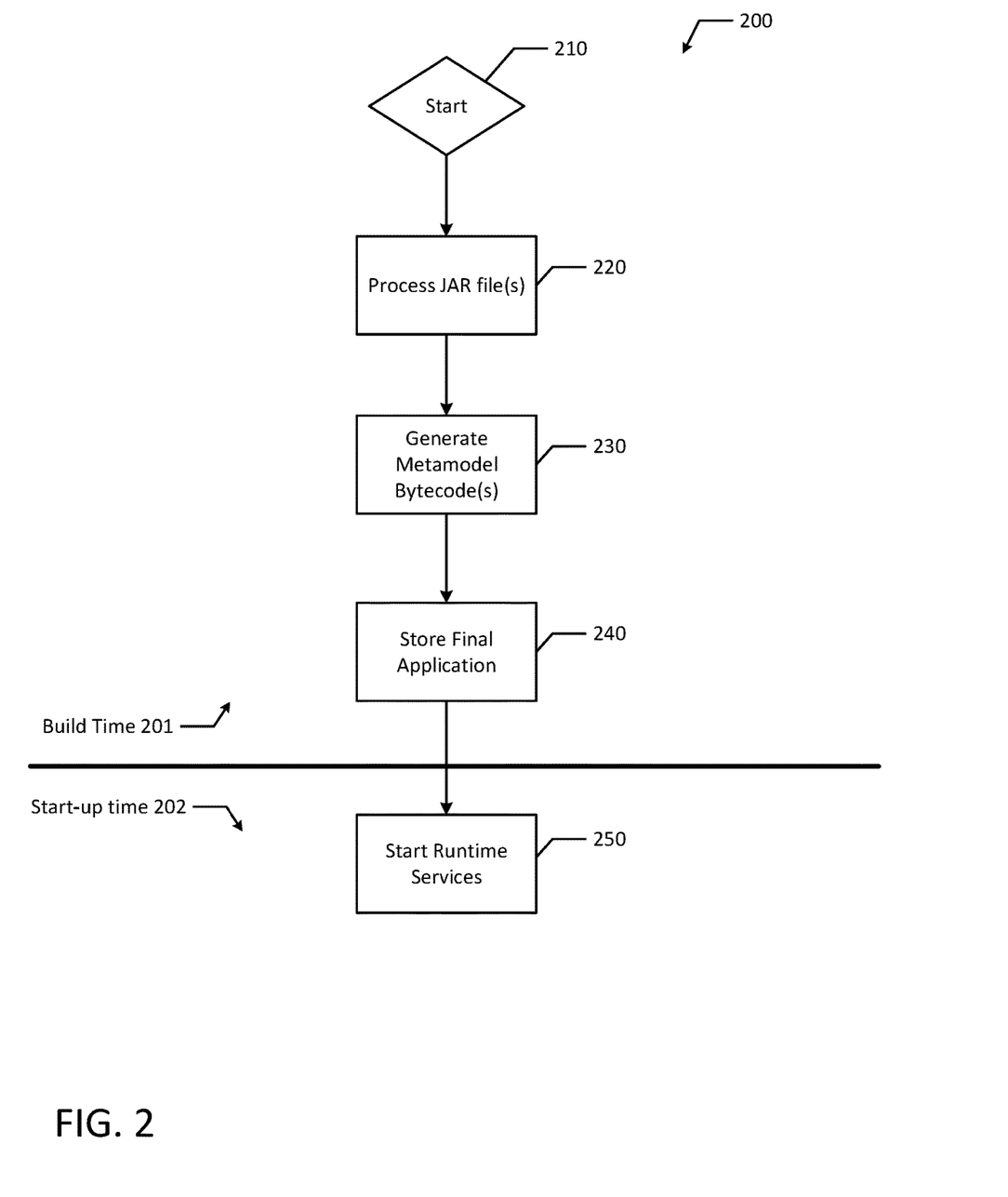
FIG. 2 illustrates a flowchart of an example process for building an application according to an example embodiment of the present disclosure.

FIG. 2 illustrates a flowchart of an example method 200 for implementing object validation (or similarly web request handling, object relational mapping and/or messaging) via direct bytecode generation. The bytecode may be used for application deployment. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes starting an application build (block 210) prior to start-up time 202 (e.g., at build time 201). Then, method 200 includes processing Java Archive (JAR) file(s) (block 220). For example, a processor 120 may process application files 162A-F, such as JAR file(s). A JAR file or JAR is a package file format typically used to aggregate many Java class files and associated metadata and resources (e.g., text, images, etc.) into one file for distribution. JAR files may be "uber-jars", which may also be referred to as "over-jars" or "fat-jars", which are used to create single application packages.

The processor 120 may also generate metamodel bytecode (block 230). For example, the processor 120 may generate bytecode that includes the metamodel (e.g., metamodel bytecode) for at least one of object validation, web request handling, object relational mapping and/or messaging. For example, the metamodel may contain the logic to perform object validation. Specifically, bytecode may be directly generated that contains the logic for validating applicable classes in an application. The metamodel may also contain the logic to perform web request handling or messaging. Additionally, the metamodel may contain the logic to handle web requests.

After generation the metamodel bytecode, the metamodel bytecode, which is used for the final application, is stored (block 240). For example, the bytecode can be stored on the disk or it can be loaded directly into a ClassLoader in memory. At start-up time 202, the bytecode can be used to start runtime services of the application (block 250). Since the metamodel can be packed in the application without having to build the metamodel at start-up, the start-up time and memory usage of the application are advantageously reduced, which is especially important for high density cloud environments. Additionally, directly generating the bytecode that contains the metamodel prevents extra code from being compiled at compile time, which allows for faster turnaround time for application developers, increasing productivity.

Figure 3:
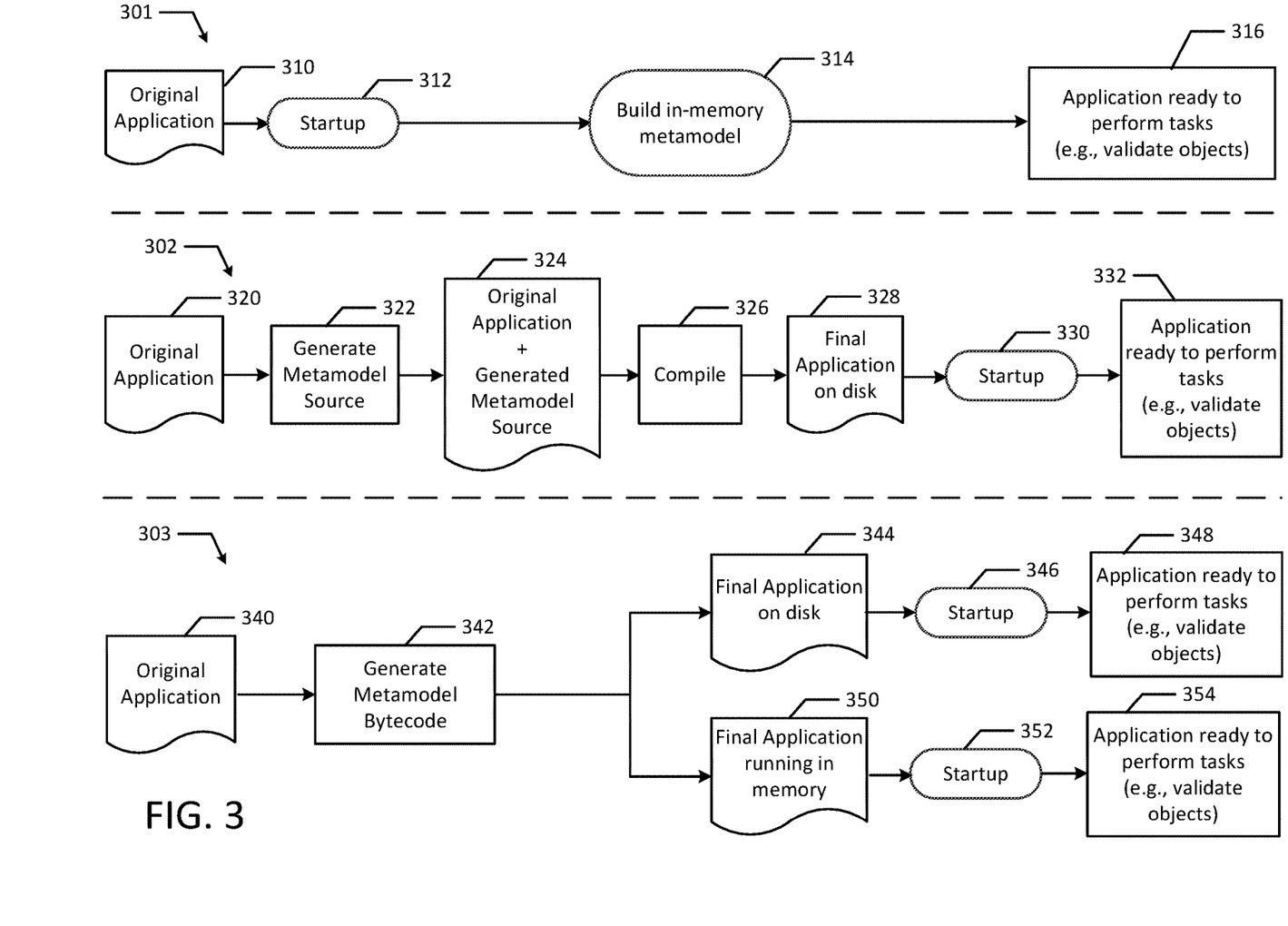
FIG. 3 illustrates methods for building an application according to various example embodiments of the present disclosure.

FIG. 3 illustrates processes 301, 302 and 303 for building an application 198. One approach, such as process 301, for creating a final application 198 on disk may include taking original application files 162 (block 310) and after startup (block 312), building an in-memory metamodel (block 314). For example, when the application is started, the application is scanned (e.g., original application files are scanned) and the in-memory metamodel is built from the discovered applications at block 314. Then, the application is ready to perform tasks, such as validating objects (block 316). However, generating application code at start-up time is a complex process because annotations are parsed and then processed. Parsing and processing annotations at start-up time may involve loading several different classes and may lead to an application with a larger memory footprint and may incur additional memory costs.

Another approach, such as process 302, for creating a final application 198 on disk may include taking original application files 162 (block 320) and generating metamodel source code (block 322) at compile time. Then, the original application files 162 together with the generated metamodel source code (shown at block 324) are compiled (block 326). After compilation, the compiled files are saved as the final application on disk (block 328). Then, at startup (block 330), the application starts and is ready to perform tasks, such as validating objects (block 332). However, generating the metamodel as source files that are compiled as part of the compilation process ties object validation (or similarly web request handling, object relational mapping and/or messaging) to the compilation process and results in extra source files (e.g., the generated metamodel source files) that are then compiled. The additional source files that require compilation can significantly slow down the compilation process and result in increased test system latency.

Conversely, process 303 starts with the application source files 162 in the original application (block 340) and then implements object validation (or similarly web request handling, object relational mapping and/or messaging) via direct bytecode generation, which allows metamodel bytecode to be generated (block 342) directly from the application source files 162. The metamodel bytecode is built prior to start-up time, which advantageously allows for efficient application deployment at start-up time. Additionally, the metamodel bytecode is not tied to a compilation process, which allows for more efficient and flexible application updates. For example, the application updates may be achieved without completely recompiling the application 198. After generating the metamodel bytecode, the bytecode can be saved as the final application on disk (block 344). Then, at startup (block 346), the application starts and is ready to perform tasks, such as validating objects (block 348). In an alternative example, after generating the metamodel bytecode, the bytecode can be saved as a final application running in memory (block 350). For example, the final application may be loaded into a ClassLoader in memory. Then, at startup (block 352), the application starts and is ready to perform tasks, such as validating objects (block 354).

Figure 4:
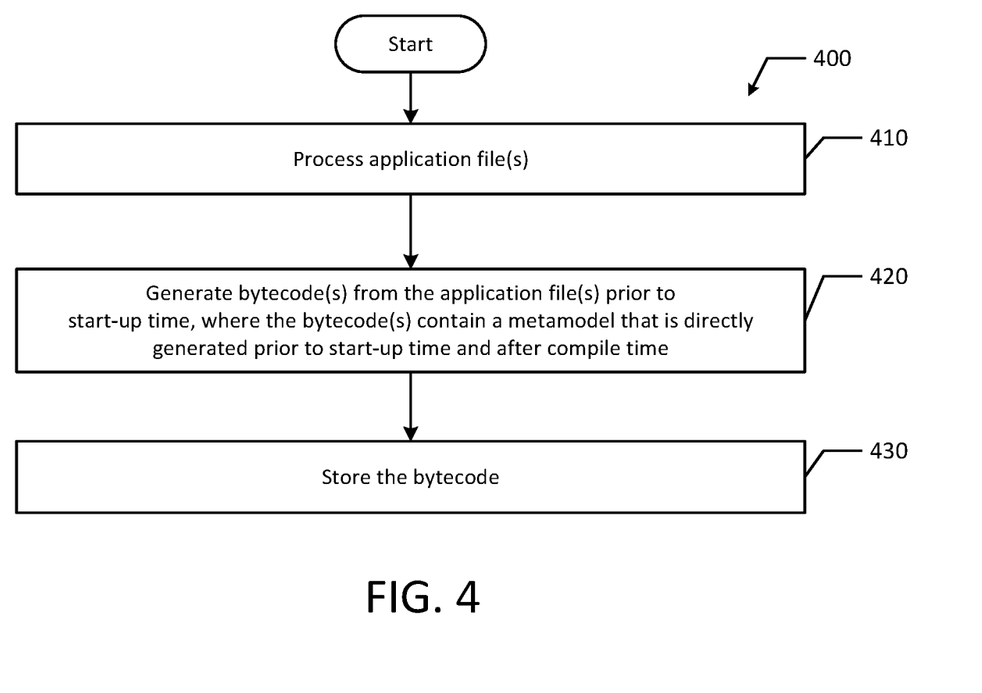
FIG. 4 illustrates a flowchart of an example process for implementing object validation via direct bytecode generation according to an example embodiment of the present disclosure.

FIG. 4 illustrates a flowchart of an example method 400 for implementing object validation via direct bytecode generation. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both. It should be appreciated that a similar method may be used for implementing one or more of web request handling, object relational mapping and/or messaging via direct bytecode generation.

The example method 400 includes processing application file(s) (block 410). For example, a processor 120 may process the application file(s) 162. Processing the application file(s) 162 may include loading the application files 162, unpackaging and extracting the files from a folder or ZIP folder, verifying the files, assigning memory references and resolving memory references for the files, and copying the files to a directory, etc. Processing the application file(s) 162 may also include rearranging, combining or linking the application files 162 (e.g., extracted application files) and passing the files to a serializer. Then, method 400 includes generating bytecode from the application file(s) prior to start-up time where the bytecode contains a metamodel that is directly generated prior to start-up time and after compile time (block 420). For example, responsive to processing the application file(s) 162, the processor 120 may generate bytecode from the application file(s) prior to start-up. In an example, a serializer may serialize the application file(s) to output the bytecode. The bytecode may contain a metamodel that handles object validation. For example, the metamodel may contain logic that performs object validation. Additionally, the metamodel is directly generated as the bytecode prior to the start-up time and after a compile time.

In an alternative example, the bytecode may contain a metamodel that handles web requests. For example, bytecode may be directly generated that contains the logic for web request handling. The metamodel may use annotations to simplify the development and deployment of web service clients and endpoints. Specifically, bytecode containing a metamodel(s) for web request handling may provide functionality for various different use cases and may include complex matching rules that include other information from the request.

In another alternative example, the bytecode may contain a metamodel that handles object relational mapping. For example, bytecode may be directly generated that contains the logic for object relational mapping. The metamodel may define relationships between entities, and these relationships may be expressed through object-relational metadata. Specifically, bytecode containing a metamodel for object relational mapping may include a class or classes that map to a specific database table and annotations may be provided that provide instructions on how to map the class to the database. In another alternative example, the bytecode may contain a metamodel that handles messaging. For example, bytecode may be directly generated that contains the logic for messaging.

Unlike metamodels that are generated at start-up time or that are generated at source files and compiled at compile time, the processor 120 directly generates the metamodel as bytecode. Additionally, method 400 includes storing the bytecode (block 430). For example, the bytecode may be stored as a final application file. In an example, the processor 120 may store the bytecode that includes the metamodel, and the bytecode may be stored on disk or as final application running in memory.

Figure 5:
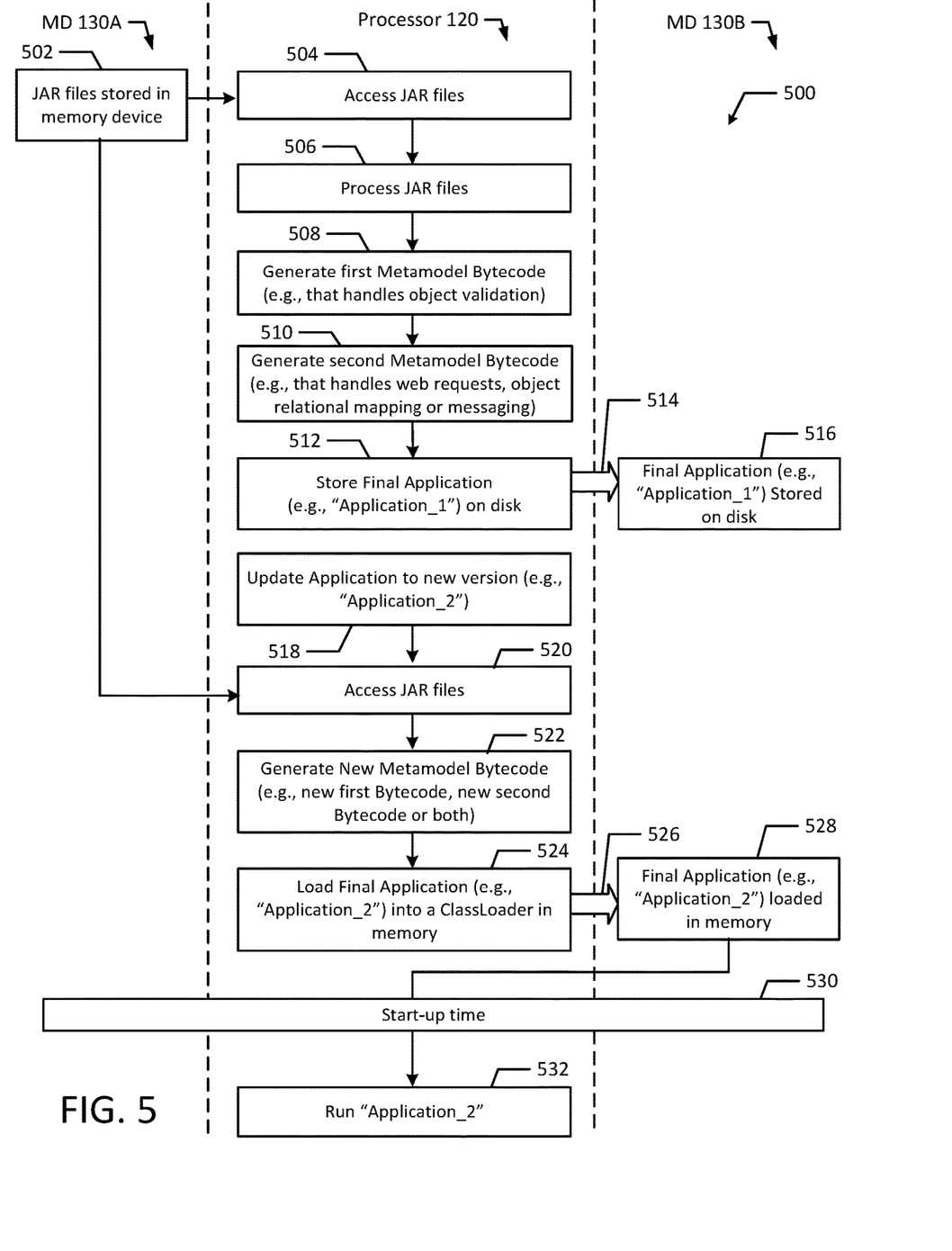
FIG. 5 illustrates a flow diagram of an example process for implementing object validation, web request handling, object relational mapping and/or messaging via direct bytecode generation according to an example embodiment of the present disclosure.

FIG. 5 illustrates a flowchart of an example method 500 for object serialization and application deployment in accordance with an example embodiment of the present disclosure. Although the example method 500 is described with reference to the flowchart illustrated in FIG. 5 it will be appreciated that many other methods of performing the acts associated with the method 500 may be used. For example, the order of some of the blocks may be changed, certain blocks may be combined with other blocks, blocks may be repeated, and some of the blocks described are optional. For example, a processor 120 may communicate with memory devices 130A and 130B and application files 162 to perform example method 500.

In the illustrated example, JAR files (e.g., application files 162) are stored in a memory device 130A (block 502). For example, the JAR files may be stored on memory device 130A in the ZIP file format. The processor 120 accesses the JAR files (block 504) and processes the JAR files (block 506). For example, the contents of the JAR files may be unpackaged, extracted and processed. While extracting the files, the processor 120 may make copies of the desired files and may write them into a current directory. Additionally, the processor 120 may create directory images, if the directory images do not already exist, and may place a copy of the desired files within the image. In other examples, other application files may be used such as application metadata, etc.

Then, the processor 120 generates first metamodel bytecode that handles object validation from the JAR files (block 508). The metamodel may contain logic to perform object validation. For example, the metamodel may be used to decide if a given object is valid by providing frames, rules, constraints, confines, etc. for determining if the given object is valid. In one example, the object validation metamodel may be used to create an application to validate a request from a web service or validate an input to ensure that the input is in the proper form (e.g., integer, string, etc.). The processor 120 may also generate second metamodel bytecode that handles web requests, object relational mapping or messaging from the JAR files (block 510). Similar to the first metamodel generated at block 508, the second metamodel may contain logic to perform web request handling, object relational mapping or messaging.

After generating the first and second metamodel bytecode, the processor 120 stores the final application 514 (e.g., "Application_1") on disk (block 512). For example, by storing the bytecode for the final application 514 (e.g., "Application_1") on disk, the production application 514 has a smaller memory footprint.

Then, the final application 514 (e.g., "Application_1") is stored on disk, such as on memory device 130B (block 516). After the application is stored on disk, the bytecode may be used to deploy the application with the smaller memory footprint at start-up time. The memory savings become more substantial when starting nodes or application instances in cloud environments. For example, using an additional MB of memory at compilation time, build time, or at start-up time may not appear significant for a single application, but in cloud environments with thousands of nodes running application instances (where each would use an additional MB of memory), the memory savings is more pronounced on a large scale, the reduction in necessary hardware (e.g., RAM) may be quite significant.

As illustrated in FIG. 5, during the application development process, a developer may update the application to a new version. For example, the developer may initiate updating the application to a new version (e.g., "Application_2") using the processor 120 (block 518). The processor 120 may again access the JAR files (block 520) and generate new metamodel bytecode (block 523). For example, the processor 120 may generate new metamodel bytecode from the same JAR files. The processor 120 may generate new first metamodel bytecode for object validation, generate new second metamodel bytecode, or may generate new first and second metamodel bytecode. For example, the new metamodel bytecode for object validation may include a different set of rules, constraints, confines, etc. for determining if the given object is valid than the bytecode generated for "Application_1."

In order to allow for additional development, the processor 120 may load the final application 526 (e.g., "Application_2") into a ClassLoader in memory (block 524). For example, the processor 120 may load the bytecode for the final application 526 (e.g., "Application_2") in memory. In an example, the ClassLoader may be a Java ClassLoader, which is a part of a Java Runtime Environment ("JRE") that dynamically loads Java classes into a Java Virtual Machine. The ClassLoader may be responsible for locating libraries, reading their contents, and loading the classes contained within the libraries. This loading is typically done on-demand, in that it does not occur until the class is called by the program.

Then, the final application 526 (e.g., "Application_2") is loaded in memory (block 528). In an example, Java classes are loaded into memory when required by an application instead of being loaded all at once. At this point, the Java ClassLoader is called by the JRE and the ClassLoaders load classes into memory dynamically. By loading the final application (e.g., "Application_2") in memory, additional application updates can be generated on the fly and allows for faster workflow in testing environments.

At start-up time (block 530), the processor 120 may run the application 526 (e.g., "Application_2") (block 532). The metamodel bytecode may be used to run several different instances of the application 526 across different nodes. The present disclosure is especially advantageous to cloud providers that want to optimize the efficiency of the cloud by reducing start-up times and reducing memory usage. For example, runtime services of an application 526 started from the generated metamodel bytecode may allow for almost instant start-up times and require less memory as compared to traditional approaches.

Figure 6:
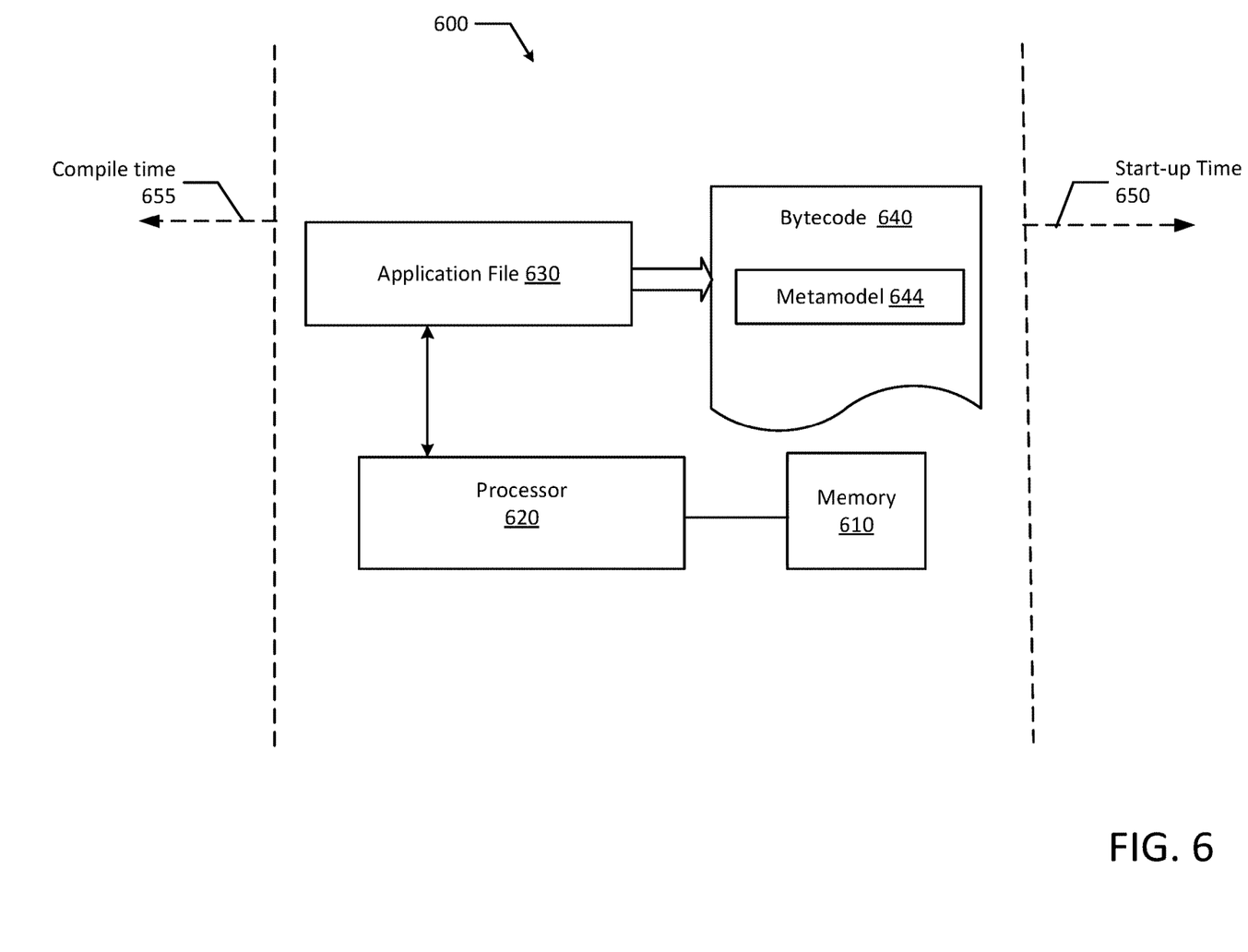
FIG. 6 illustrates a block diagram of an example bytecode generation system according to an example embodiment of the present disclosure.

FIG. 6 is a block diagram of an example bytecode generation system 600 according to an example embodiment of the present disclosure. The bytecode generation system 600 includes a memory 610 and a processor 620 in communication with the memory 610. The processor 620 is configured to process an application file 630. Responsive to processing the application file 630, the processor 620 is configured to generate at least one (e.g., bytecode 640) from the application file 630 prior to start-up time 650. The bytecode 640 of the at least one bytecode contains a metamodel 644 and the metamodel 644 handles object validation. Additionally, the metamodel 644 is directly generated as the bytecode 640 prior to the start-up time 650 and after a compile time 655. The processor 120 is also configured to store the first bytecode 640.

By generating the bytecode 640 with the metamodel 644 prior to start-up time, the resulting application uses less memory, provides increased start-up efficiency, and reduces overall application deployment resource requirements. For example, during application deployment, developers may save time and reduce the instant memory consumption of the application instance(s) at start-up, thereby reducing the memory footprint of the application instance(s) during the application's life.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory; and
a processor, in communication with the memory, configured to:
process at least one application file,
responsive to processing the at least one application file, generate at least one bytecode from the at least one application file prior to a start-up time, wherein
a first bytecode of the at least one bytecode contains a metamodel,
the metamodel handles object validation, and the metamodel is directly generated as the first bytecode prior to the start-up time and after a compile time; and store the first bytecode.

2. The system of claim 1, wherein the at least one bytecode includes the first bytecode and a second bytecode, and wherein the second bytecode contains a second metamodel.

3. The system of claim 2, wherein the second metamodel is configured for web request handling.

4. The system of claim 2, wherein the second metamodel is configured for object relational mapping.

5. The system of claim 2, wherein the second metamodel is configured for messaging.

6. The system of claim 1, the process is configured to store the first bytecode as one of (i) a final application file on disk or (ii) a final application running in the memory.

7. The system of claim 1, wherein the first bytecode is loaded directly into a ClassLoader in the memory.

8. The system of claim 1, wherein the first bytecode is Java Virtual Machine bytecode.

9. The system of claim 1, wherein the processor is a virtual processor, and wherein the virtual processor executes in a virtual machine.

10. The system of claim 1, wherein the metamodel is adapted to be pre-built and packaged in the application without building at start-up time.

11. A method comprising:
processing at least one application file;
responsive to processing the at least one application file, generating at least one bytecode from the at least one application file prior to a start-up time, wherein
a first bytecode of the at least one bytecode contains a metamodel,
the metamodel handles object validation, and
the metamodel is directly generated as the first bytecode prior to the start-up time and after a compile time; and
storing the first bytecode.

12. The method of claim 11, wherein the first bytecode is stored as one of (i) a final application file on disk or (ii) a final application running in memory.

13. The method of claim 11, wherein object validation includes validating an input by ensuring the input is at least one of the proper length or of the proper type, wherein the type is one of an integer or a string.

14. The method of claim 11, wherein object validation includes validating an object based on at least one of a field-level constraint, a property-level constraint, and a class-level constraint.

15. The method of claim 11, wherein the at least one bytecode includes the first bytecode and a second bytecode, and wherein the second bytecode contains a second metamodel.

16. The method of claim 15, wherein the second metamodel is configured for web request handling, and wherein the web request handling is configured to control which class handles requests associated with a predetermined destination.

17. The method of claim 15, wherein the second metamodel is configured for object relational mapping, and wherein the object relational mapping controls mapping a class to a database.

18. The method of claim 15, wherein the second metamodel is configured for messaging, and wherein the metamodel maps a plurality of messaging channels to a plurality of fields.

19. The method of claim 15, further comprising starting a runtime service from at least one of the first bytecode and the second bytecode.

20. A non-transitory machine-readable medium storing code, which when executed by a processor is configured to:
process at least one application file;
responsive to processing the at least one application file, generate at least one bytecode from the at least one application file prior to a start-up time, wherein
a first bytecode of the at least one bytecode contains a metamodel,
the metamodel handles object validation, and
the metamodel is directly generated as the first bytecode prior to the start-up time and after a compile time; and
store the first bytecode.

* * * * *